(12) United States Patent
Zhao

(10) Patent No.: US 7,975,685 B2
(45) Date of Patent: Jul. 12, 2011

(54) SOLAR COLLECTING AND UTILIZING DEVICE

(76) Inventor: Xiaofeng Zhao, Guangdong (CN)

( * ) Notice: Subject to any disclaimer, the term of this patent is extended or adjusted under 35 U.S.C. 154(b) by 731 days.

(21) Appl. No.: 10/570,887

(22) PCT Filed: Nov. 13, 2003

(86) PCT No.: PCT/CN03/00958
§ 371 (c)(1),
(2), (4) Date: Jul. 16, 2007

(87) PCT Pub. No.: WO2005/043049
PCT Pub. Date: May 12, 2005

(65) Prior Publication Data
US 2008/0087276 A1    Apr. 17, 2008

(51) Int. Cl.
F24J 2/10   (2006.01)
F24J 2/38   (2006.01)
F24J 2/12   (2006.01)

(52) U.S. Cl. ......... 126/683; 126/600; 126/603; 126/690

(58) Field of Classification Search .................. 126/683, 126/603, 300, 605, 684
See application file for complete search history.

(56) References Cited

U.S. PATENT DOCUMENTS

| | | | | | |
|---|---|---|---|---|---|
| 3,118,437 | A | * | 1/1964 | Hunt | 126/600 |
| 3,171,403 | A | * | 3/1965 | Drescher | 126/603 |
| 3,466,119 | A | * | 9/1969 | Giovanni | 359/851 |
| 3,644,030 | A | * | 2/1972 | Fukushima | 353/98 |
| 3,670,717 | A | * | 6/1972 | Abbot | 126/687 |
| 4,034,737 | A | * | 7/1977 | Kume | 126/603 |
| 4,068,474 | A | * | 1/1978 | Dimitroff | 60/641.15 |
| 4,139,286 | A | * | 2/1979 | Hein et al. | 353/3 |
| 4,183,612 | A | * | 1/1980 | Taucher | 359/364 |
| 4,300,538 | A | * | 11/1981 | Uroshevich | 126/649 |
| 4,351,319 | A | * | 9/1982 | Robbins, Jr. | 126/580 |
| 5,274,497 | A | | 12/1993 | Casey | |
| 5,289,356 | A | | 2/1994 | Winston | |
| 5,325,844 | A | * | 7/1994 | Rogers et al. | 126/605 |
| 5,540,216 | A | * | 7/1996 | Rasmusson | 126/683 |
| 5,578,140 | A | * | 11/1996 | Yogev et al. | 136/246 |
| 5,632,823 | A | * | 5/1997 | Sharan | 136/246 |

(Continued)

FOREIGN PATENT DOCUMENTS
CN      1373334      10/2002

*Primary Examiner* — Steven B McAllister
*Assistant Examiner* — Frances Kamps
(74) *Attorney, Agent, or Firm* — Merchant & Gould P.C.

(57) ABSTRACT

The present invention relates to a solar collecting and utilizing device, comprising: one or more paraboloidal light collecting mirrors for collecting/converging the sunlight; a light guider including a light guider mirror for receiving the sunlight converged by said paraboloidal light collecting mirrors and converting it into parallel light beams in a desired direction; one or more curved surface condenser mirrors for receiving/converging substantially parallel light beams from said light guider; a solar storage and conversion device for storing/converting the energy converged by said curved surface condenser mirrors; a solar tracking equipment for tracking automatically the sunlight so as to always keep the opening surface of said paraboloidal light collecting mirrors substantially vertical to the sunlight. The focus of said light collecting mirror always superposes the focus of the corresponding light guider mirror. Such device can enhance highly the solar collecting density, centralize the energy conversion/utilization points, simplify the sunlight tracking mechanism, improve the mechanical reliability of the whole system, and lower the investment and the cost of operation.

9 Claims, 5 Drawing Sheets

U.S. PATENT DOCUMENTS

| | | | | |
|---|---|---|---|---|
| 5,685,289 A | * | 11/1997 | Yogev | 126/400 |
| 6,691,701 B1 | * | 2/2004 | Roth | 126/685 |
| 6,811,271 B2 | * | 11/2004 | Hayakawa et al. | 359/846 |
| 6,953,038 B1 | * | 10/2005 | Nohrig | 126/694 |
| 7,207,697 B2 | * | 4/2007 | Shoji | 362/319 |

* cited by examiner

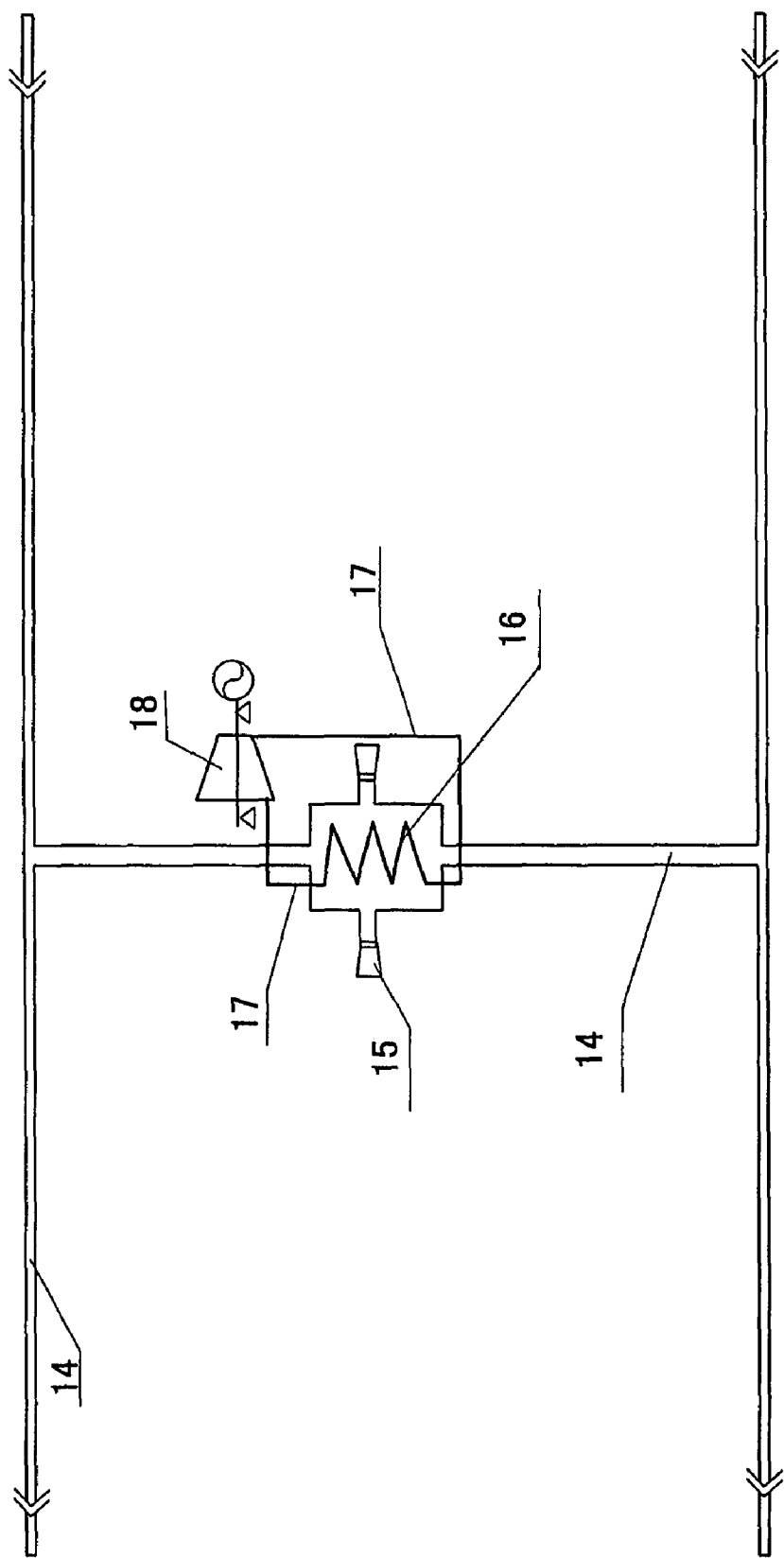

SOLAR COLLECTING AND UTILIZING DEVICE

TECHNICAL FIELD

The present invention relates to a solar utilizing device, specifically, to a focusing type solar utilizing device.

BACKGROUND ART

The solar energy, an ideal recycle energy, is a kind of energy source which can be endlessly used and does not produce any pollution. There is still an infinite and marvelous potentialities of applying the solar energy. However, the applied solar energy technique is far from satisfying the requirements of its commercial use.

Research on applying solar energy technique is in progress at various aspects but the common problem that the solar energy density is too low still exits. Even if the sun irradiates in a vertical direction in a fine day, the maximum value of the solar energy density is about 1000 watt/$m^2$ only. This restrains the development of the technology in this field.

The applied non-focusing solar energy technique includes, for example, transforming the sunlight directly into the electrical energy through a solar energy battery. Because the solar power generation efficiency is about 15% and the cost of manufacturing the solar energy battery is high at present, the peak power of a solar cell panel of 1 $m^2$ is only about 150 watt and the electric energy thus generated is about 200 kw each year, and the unit cost of the electrical energy is ten times of the thermal power generation. Such high cost of manufacturing electricity completely cannot be considered as a purpose for the commercial use.

Besides, the technology of converting directly the solar energy into the heat energy means to transform the solar energy into hot water, hot steam or other hot melt material. Nowadays, the widely used vacuum tube water heaters which utilize the solar energy at lower temperature can only produce hot water at 80 to 90° C. in summer and 40 to 50° C. in winter due to the energy density of the solar energy is too low even the sunlight irradiates the vacuum tube directly. The water with such temperature can only be used for the family showers and not for other purposes.

The key problem of solar utilization is that the solar energy density is too low to be used. Hence, it is a possible way to focus the solar energy by a condenser mirror so as to increase the solar energy density for the subsequent utilization. In recent years, many experts have tried various light collecting devices to solve the problem but all failed. There is no collecting device deserving a commercial use hitherto. The most difficult technical problem to be solved is that the condenser mirror has to follow the sun to obtain a higher solar energy ratio, which no doubt will increase greatly the running cost of the whole system.

In the past, people had made a refraction condenser mirror with refractors, which could be further made into a solar high temperature furnace with plane mirrors, on the basis of the refraction principle. Obviously, the glass mirrors are heavy in weight, the manufacture process is complex and, of course, the cost is very high and then the condenser mirror could not be produced in a large size. Hence, the refraction condenser mirror ceases to get a further development. In 70's of last century, people developed large-scaled planarized Fresnel mirror so as to make a solar collecting heater. The Fresnel mirror is light in weight and costs lower and has functions of point focusing and line focusing. It is typically made of organic glass or other transparent plastic materials or glass. The Fresnel mirror is mainly used for a power generation system with solar battery, but the results are not good.

The popular solar collecting and utilizing devices are all reflector types. These devices include an absorber and a tracking system besides the reflector and are of three types: tank type solar collecting unit, tower type solar collecting unit and disk type solar collecting unit. 1). The tank type solar collecting unit is also called the tank type line-focusing system. The unit uses the parabolic cylinder tank type reflector to focus sunlight on the tube-like collectors to heat the heat transferring working medium in the tube and to obtain the intermediate temperature working medium and then to produce steam in a heat exchanger and thus make a conventional steam turbine running to generate electricity. The unit needs a unidimensional tracking. 2). The tower type solar collecting unit is also called as the tower type focusing system. The basic structure of the unit includes a plurality of heliostats comprising plane reflectors or curved surface reflectors, which track the sun individually. These heliostats reflect and focus the sunlight on a collector fixed on the top of the high tower under the control of a computer. The working medium in the collector may approach to a high temperature and then obtain a great energy. 3). The disk type solar collecting unit also refers to the dish type focusing system or Sterling system. The dish type focusing system consists of paraboloidal reflectors. The receiver is set on the focus of the paraboloid and the heat transferring working medium therein is heated to about 750° C. and thus makes the engine generate electricity. Such systems are capable of approaching to high temperature but also need a two-dimensional tracking.

The above-mentioned three systems share a common defect: the transformation between the light energy and the heat energy is carried out in open air, and the loss of the heat is great. Since the revolution way of each light collecting mirror in the tower type system is different with each other, the control process is complicated and the requirements for the reflection and the tracking precisions are strict, therefore, the costs for design, installation, operation and maintenance are high. Meanwhile, building a high tower occupies a large part of the investment.

The efficiency of the heat transformation of the tank type system becomes low because of the change of focusing. In addition, a tracking equipment needs a reflector with a larger area as well as an oil duct containing intermediate oil for heat transformation. However, the wind proofing and the heavy weight of the equipment itself require a high intensity of the tracking equipment, resulting in a high cost for manufacturing a carrier equipment. Also, the oil for heat transformation makes a part of the investment. Due to the limitation of evaporating temperature of the oil, the resulting evaporating temperature for power generation will be lower as less than 350° C. As a result, the efficiency of power generation is low. Moreover, because the ability of the heat storage in the system is low and the time of the usage of the power equipment is short, the total cost for electricity generation is much higher than that using the conventional energy sources.

The disk system meets the requirements of the generation capacity only when its light collecting mirrors have enough areas, generally larger than 50 square meters, and thus a high wind proofing intensity for the tracking equipment is necessary. In addition, the power generation equipment is also secured on the tracking equipment, resulting in a high cost for manufacturing the tracking equipment. Moreover, the system can only generate electricity during the radiation of the sun and cannot store heat, thus, the efficient utilizing time per year of the system (when in a full load) is less than 2,000 hours.

And its total cost for electricity generation is much higher than that using the conventional energy sources.

The table given below shows the main technical and economic parameters for these three systems.

|  | Tank type system | Tower type system | Disk type system |
|---|---|---|---|
| power (megawatt) | 30-320 | 10-20 | 5-25 |
| running temperature (°C.) | 390/734 | 565/1049 | 750/1382 |
| year capacity factor | 23%-50% | 20%-77% | 25% |
| peak value efficiency | 20% | 23% | 29% |
| year net efficiency | 11%-16% | 7%-20% | 12%-25% |
| Storage condition | limited | yes | By secondary cell |
| USD/m2 | 630~275 | 475~200 | 3.100~320 |
| USD/watt | 4.0~2.7 | 4.4~2.5 | 12.6~1.3 |

In order to resolve the technical problem, different technical solutions have been taken into consideration in the art, e.g., trying to give up the way of using a collecting mirror to track the sun. A Chinese patent No. 96192811.5 discloses a non-tracking line-type solar focusing system with a high efficiency. Instead of positioning the receiver to extend from the focal line to the outwardly extending line of the focal line, in the patent, each end of the focal line of the condenser mirror in the system is provided with a lateral reflect plate which is perpendicular to the focal line and connected to each end of the condenser mirror such that the length of the energy collector and the length of the receiver can be both shortened. In the Chinese patent, the primary solar energy collector adopts the curved surface reflector disclosed in the U.S. Pat. No. 5,289,356, the secondary solar energy collector adopts the curved surface reflecting condenser mirror disclosed in the U.S. Pat. No. 5,274,497; the secondary solar energy collector is located near ½ of the radius of curvature of the primary solar energy collector and disposed with a fluid transport conduit longitudinally. Obviously, such improved technology still needs to keep a precise tracking control system and is equivalent to an ordinary line focusing reflector which converges the solar energy only once and thus fails to increase remarkably the density of the solar energy flowing into the fluid transport conduit. Therefore, the technology only meets the requirements of the small-scaled low temperature ranges ($\leqq 200°$ C.) and has no significant effect in the industrialized energy production. Moreover, if the temperature is very high, the movable connection between the thermal conduits will be a problem.

Contents of the Invention

With regard to the defects existed in the art utilizing solar energy, the technical problems need to be resolved in the present invention are to provide a solar collecting and utilizing device which can enhance highly the solar condensing density, centralize the energy conversion/using point, simplify the solar tracking mechanism, improve the mechanical reliability of the whole system, and lower the investment and the cost of operation.

The technical solution of the present invention relates to a solar collecting and utilizing device. The device comprises: one or more paraboloidal light collecting mirrors for collecting/converging the sunlight; a light guider including a light guider mirror for receiving the sunlight converged by said paraboloidal light collecting mirrors and converting it into parallel light beams in a desired direction; one or more curved surface condenser mirrors for receiving/converging substantially parallel light beams from said light guider; a solar storage and conversion device for storing/converting the energy converged by said curved surface condenser mirrors; a solar tracking equipment for tracking automatically the sunlight so as to always keep the opening surface of said paraboloidal light collecting mirrors substantially vertical to the sunlight. The focus of said light collecting mirror always superposes the focus of the corresponding light guider mirror. Each paraboloidal mirror is fixed with a light guider and the light guiders on many paraboloidal mirror can share a common curved surface condenser mirror. In the latter case, some light guiders on different paraboloidal mirror either permanently share a common curved surface condenser mirror, or alternately share several adjacent curved surface condenser mirrors according to the changes of the daylight, seasons and weathers, etc., which in fact still share a common curved surface condenser mirror. The present invention improves a conventional sunlight collector as a structure containing both light guider and curved surface condenser mirror based on following principle of optics: a mirror capable of point focusing the light can transmit the light located on its focus as a parallel light beam after refraction or reflection. Wherein the light guider is configured to transmit the energy as a light energy and then have the light energy receiving a second convergence through the curved surface condenser mirror. With the improvement, a plurality of light guiders can point at and use a common curved surface condenser mirror, and the curved surface condenser mirror can re-converge the primarily condensed light reflected from a number of paraboloidal mirrors and light guiders. Such secondary or even more multiple stages of solar convergence re-converge in parallel the light having been primarily condensed by the light collecting mirror with large area onto the curved surface condenser mirror through the light guider, and direct the converged light to the relative small and fixed space in the solar storage and conversion device through a secondary re-convergence, so that the convergence density of the solar energy is much higher than that obtained by the conventional disk type or tank type or even tower type of light convergence devices, which makes sure that the absorption or the conversion of the high energy density can be carried out in the solar storage and conversion device. Hence, the solar energy density obtained by the device of the present invention is greatly increased, which assures the final solar receiving and conversing working medium can be heated to the desired high temperature. Moreover, the high level convergence can heat the energy receiving medium to a high temperature and help realize the high temperature preserving, and then increase the year average working hours of the equipment using the generated heat energy, meanwhile lower the cost of manufacturing the whole system. Further advantages of the device of the present invention show that: transferring the primarily condensed energy as the type of the solar energy can greatly decrease the complexity, the expense and the consumption of transferring energy during the process of the energy convergence, compared to the conventional transferring technique using the melted mass, gas, fluid, wires, etc.; instead of setting up the solar storage and conversion device on a high tower as the conventional tower type solar collecting device did, the present solar storage and conversion device for transferring/using the solar energy can be built on the ground not on a tower, and the primary light collecting, secondary transferring and the following solar energy convergence can all be carried out on the ground, which result in that the investment and the cost for maintaining the system become much lower; it is easier to aim a plurality of solar collecting mirrors at the curved surface condenser mirror through the guider mirror, and the requirement for the tracking precision is low, thus a single tracking equipment is capable of controlling multiple solar collecting mirrors at the same time and it is also possible for the multiple solar collecting mirrors to track synchronously the sunlight, which largely simplifies the control system compared to the conventional tower type collecting device with multi-mirror and multi-dimension tracking equipment; the solar storage and conversion device is set up on the ground not on the light collecting mirror, and the implementing mechanical parts of the tracking equipment have no need to load the solar storage and conversion device as well as the working medium therein, which lower the requirement for the work intensity of the implementing mechanical parts in the tracking equipment. Hence, the reliability of the mechanism of the whole system and the sunlight tracking equipment is dramatically enhanced, meanwhile, the maintenance is convenient and the operation control is simple, so as to meet requirements of the large scaled industries.

The light guider employed in the embodiment of the present invention is a concave mirror capable of focusing light or a combination of mirrors and lens consisting of convex lens and plane reflector, wherein, the focus of the concave mirror or the convex lens superposes the focus of said paraboloidal light collecting mirror. The condenser mirror of the present invention may also be any type of optical system capable of focusing the light, more particularly, said optical system can transmit the light located on its focus as a parallel light beam after refraction or reflection. Therefore, said condenser mirror is not limited to the type and structure mentioned in the above embodiment.

In order to obtain the potential high solar concentrating density, the light collecting area of the paraboloidal mirror shadowed by the light guider must be limited to the least. Meanwhile, in order to minimize the scattering angle and maximize the range of the parallel light beam transmitted from the light guider, and maximize the number of the paraboloidal mirror and/or the light guider arranged without interference and shadow in arrays, the ratio of the solar shadow area of a light guider on a light collecting mirror to the area of the mirror opening of said light collecting mirror is less than 1.5%, and the ratio of the solar shadow area of a guider mirror on a paraboloidal mirror to the area of the mirror opening of said light collecting mirror is between 0.1%-1.5%, on the basis of the specific theoretical calculation and trials in the present invention. Correspondingly, when the paraboloidal mirror is surely capable of condensing the light, the desired paraboloidal mirror and/or the guider mirror and/or the curved surface condenser mirror are intact paraboloidal rotation type of reflection condenser mirror, or the effective parts of the paraboloid rotation surface type of the reflection condenser mirror, e.g., the arc part, the fan shaped part, the left curved surface part after the arc part is cut, the left curved surface part after the fan shaped part is cut or the half curved surface. Moreover, the ratio of the focal distance of the light collecting mirror to its mirror opening diameter is between 0.55-1.1, and the ratio of the focal distance of the guider mirror to its mirror opening diameter is between 0.1-0.3. Further, the paraboloidal mirror and/or the curved surface condenser mirror of the present invention may also adopt a complete reflection condenser mirror with asymmetrical curved surface or its effective cut parts.

To fully realize the simplification of the solar tracking equipment and the advantages of the device, the device of the present invention can be configured as a kind of array system. In the embodiments of the present invention, the mirror axes of a number of curved surface condenser mirrors are set in the direction of south to north and arranged in juxtaposition in the direction of east to west; the mirror axes of a number of guider mirrors are also set in the direction of south to north and point at arrays of curved surface condenser mirror groups horizontally; a plurality of light collecting mirrors in arrays are correspondingly set in same height in the direction of south to north and are arranged linearly in same height in the direction of east to west, and guider mirrors at different distances pointing at a same curved surface condenser mirror are arranged in a way of non-interference horizontally, or a plurality of light collecting mirrors in arrays are correspondingly set linearly in the direction of south to north and are arranged linearly in same height in the direction of east to west, and guider mirrors at different distances pointing at a same curved surface condenser mirror are arranged in a way of non-interference by stepping up. To realize simplifying the solar tracking equipment, the curved surface condenser mirror can be arranged in other array types, e.g., diamond, trapezoid, triangle, etc., according to different landforms and conditions where the device of the present invention is fixed. In conclusion, a plurality of light collecting mirrors corresponding to a same curved surface condenser mirror in the device of the present invention can be arranged in array groups, a single array group of condenser mirror is capable of converging the sunlight of more than scores of square meters. After search and investigation, it is proved that current techniques of manufacturing optical reflector can meet all the requirements of producing the parts of the device of the present invention. Meanwhile, once the device of the present invention is widely used in industry, the focus precision of the optical reflector will get further improved on the basis of the fact that the optical film deposit technique has been digitalized and the cost of manufacturing the device of the present invention will be greatly lowered. According to a rough estimation, when the device is used in a large-scaled industry, the cost will be a bit higher than building up a firepower station, but the maintenance and the operation cost will be lower than an ordinary power station. The composite cost is hopefully near or lower than the cost used for an ordinary power station. If the process of manufacturing a reflector and the techniques of building and operating the system is improved, collecting area of a single group can be further increased. Because the vapour can be decomposed into $H_2$ and $O_2$ at 3000 K, the system has a prospect of producing $H_2$ from water and hopefully it can alter basic energy structure of human being, thereby obtaining a clean energy.

At present, the material machining technique is mature, and the raw material, process and the precision all can meet the requirements of processing a paraboloid mirror, and the optical film deposit techniques develops rapidly at the same time. Therefore, the existing techniques can produce the reflector with the reflectivity over 99%, and the revolving curved surface reflector, such as, the paraboloid, can be produced in a short time with support of the conventional technology. Moreover, the conventional techniques can ensure the installation of the system on the spot.

The implementing mechanical parts in the simplified tracking system employed in the embodiment of the present invention comprise: a power supplying device, a rigid straight-bar driver, and a elevation angle control mechanism of the mirror opening of each paraboloidal mirror, wherein, the rigid straight-bar driver couples simultaneously the elevation angle control mechanism of the mirror opening of each paraboloidal mirror arranged in the same array. Said implementing mechanical parts further comprise a hydraulic driver and visual angle control hydraulic poles of the mirror opening of each paraboloidal mirror, wherein, a hydraulic driver individually connects to the visual angle control hydraulic pole of the mirror opening of each paraboloidal mirror arranged in the same array. Since a plurality of light collecting mirrors are arranged in a straight line south to north and/or east to west, said tracking equipment is configured to use a straight-bar driver, such as a straight rack, to control simultaneously the elevation angle control bevel gears of the mirror openings of each paraboloidal mirror arranged in a same line or a same array. Also, the straight-bar driver and the elevation angle control mechanism of the mirror opening can be communicated by a hydraulic connection device, through which, 5 to 50 paraboloidal mirrors arranged on the same line can use a common set of implementing mechanical parts and photoelectrical control parts of the present invention. As a result, the size and the complexity of the software and hardware of the solar tracking equipment will be greatly decreased but the reliability will be increased instead, and the cost for the system operation and the maintenance will lower to a possible extent.

The light guider of the present invention is hinged to the guider support, the lower part of said guider support is secured to the light collecting mirror or the mirror basket; said light guider comprises a rotation axis in a direction of east to west, a mirror bracket which is hinged to the guider support by said rotation axis, and a rotation mechanism which drives said mirror bracket to rotate about said rotation axis; said mirror bracket is configured and sized to have the focus of the guider mirror superposing the focus of the light collecting mirror. More specifically, the mirror bracket is fixed on two ends of the paraboloidal guider mirror which is cut into the shape of a longbow and forms a "Π" shape. Both arms of said "Π" have axle hole matching the rotation axis and the central line of said axle hole passes the overlapped focus of the light collecting mirror and the guider mirror so as to keep the focus of the guider mirror superposing the focus of the light collecting mirror whatever the depression/elevation angle of the mirror opening changes. And in practice, the mirror axis of the guider mirror basically points at the mirror opening of a certain curved surface condenser mirror horizontally. Correspondingly, the photoelectrical control parts of the present invention connect and control a plurality of straight-bar drivers, hydraulic drivers and rotation mechanism. Such configuration helps to realize that the automatic fine tuning light guider highly aims at the paraboloidal mirror and the curved surface condenser mirror with high efficiency and low cost. Since the movement course of the sun has been clearly understood, the systematic error can be effectively controlled with the precise feedback in the implementing mechanism of the tracking equipment under the control of the computer technology, which keeps the tracking equipment running with high precision and meeting the requirements of the system.

In order to increase the beam collection extent of the light guider and decrease the scattering of the beam caused by the poor quality of the mirror surface, the light guider composed of reflector according to the present invention further comprises a convex lens ring disposed between the light collecting mirror and the guider mirror and/or a concave lens ring disposed between the guider mirror and the curved surface mirror. Thus, the scattered beam at a larger deviation angle transmitted onto the guider mirror or sent out to the curved surface condenser mirror can be corrected parallel to the desired direction.

The device of the present invention uses solar energy of high temperature, then the employed solar storage and conversion device is configured as a multi-layer heat preservation structure. Said structure corresponds to multiple curved surface mirrors and has a light receiving hole with diameter a little larger than that of the focal spot of the curved surface mirror, and said light receiving hole receives the condensed light from the curved surface mirror. Moreover, said device contains a working medium for storing and/or transferring energy in its deepmost; said working medium for storing and/or transferring energy includes melted salt, water, steam, and raw smelt material or photoelectric cell. The above mentioned structure is similar to a black body structure and is helpful to preserve the heat and then various energy sources can be adopted for using the condensed solar energy.

Each curved surface condenser mirror converges the sunlight collected from a plurality of light collecting mirrors, so the largest resulting light collecting area may reach scores of square meters. Research has showed that the vapour can be decomposed into $H_2$ and $O_2$ at 3000 K. If the light with a high convergence ratio in the present system can heat the high temperature resistant medium to over 3000K, the vapour will be conducted into the medium and be heated to the decomposing temperature. It means that when the heat energy is in use, a mass of $H_2$ can be produced. The hydrogen energy is an energy source of high quality and can be reserved steadily and the critical pressure is low and is easy to be fluidified. With the advantage, the application of the present system will have a much wider prospect in the future.

DESCRIPTION OF DRAWINGS

FIG. 6 is a schematic view showing the structural principle of the solar furnace system of the present invention.

DESCRIPTION OF THE PREFERRED EMBODIMENT

Figure 1:
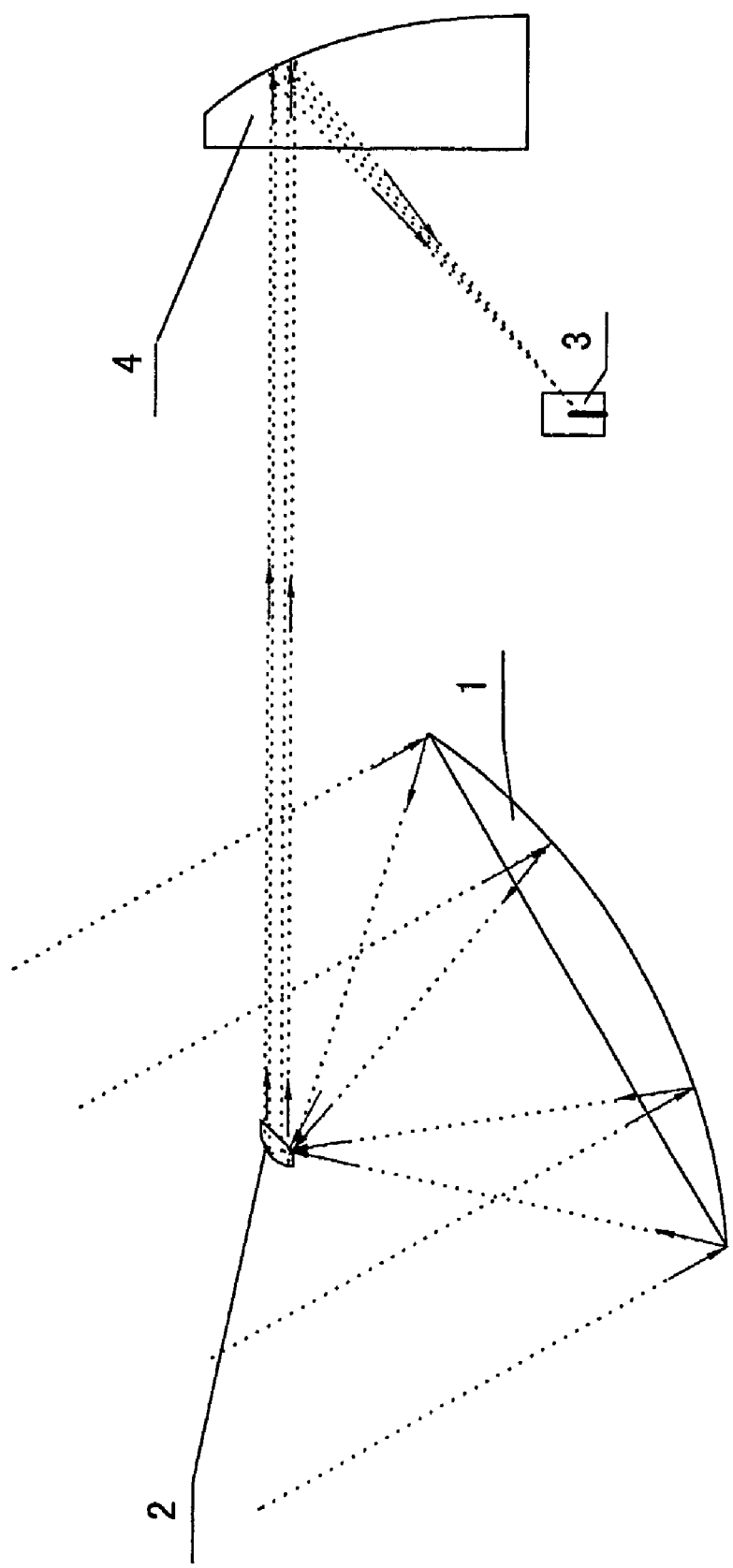
FIG. 1 is a schematic view showing the principle of the whole optical path in an embodiment of the present invention.

FIG. 1 shows a solar collecting and utilizing device, comprising: paraboloidal mirror 1 for collecting the sunlight and converging it as a facula, sunlight collector, solar storing and transferring device, solar tracking equipment, wherein said solar tracking equipment includes implementing mechanical parts and photoelectrical control parts; said sunlight collector includes light guider 2 for transferring the facula as a light beam in parallel and sending the light beam out in a desired direction, and curved surface condenser mirror 4 for receiving the parallel light beam transmitted from light guider 2 and converging them to solar storing and transferring device 3.

Figure 2:
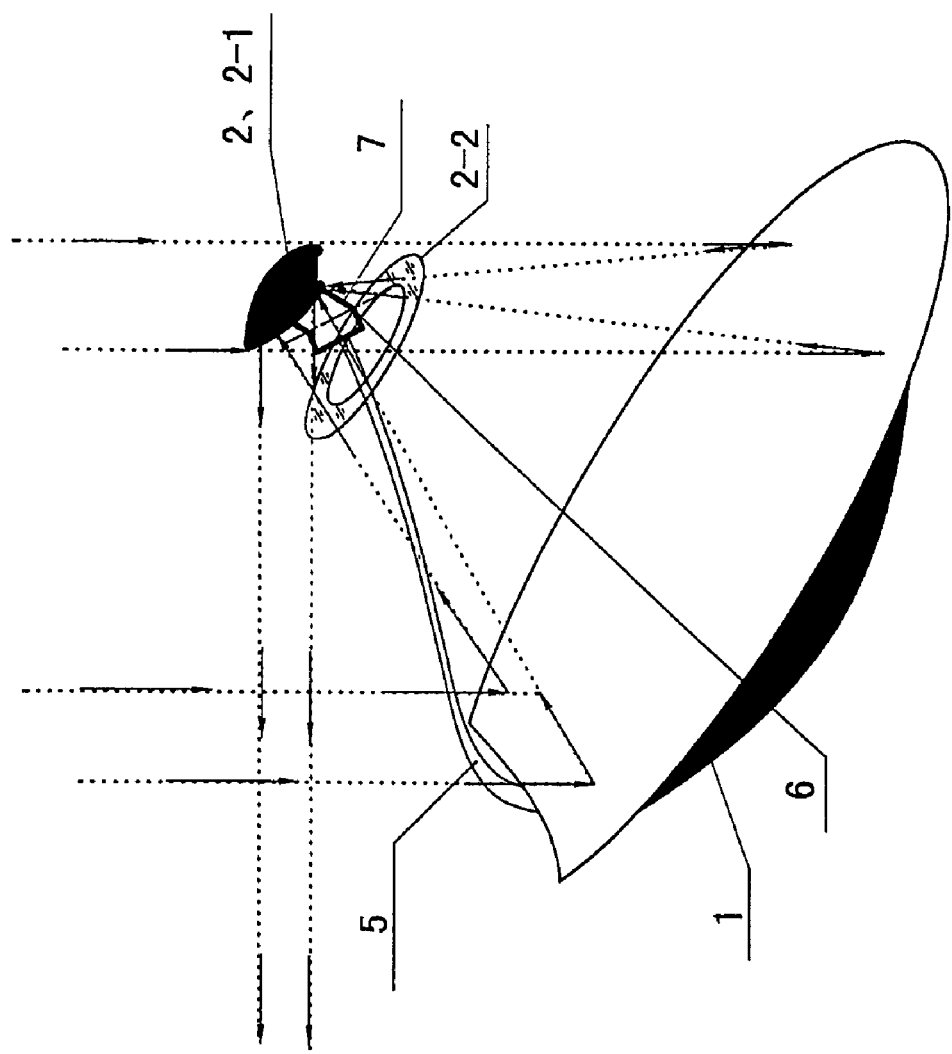
FIG. 2 is a structural schematic view showing a paraboloidal mirror and a light guider in an embodiment of the present invention.
Figure 3:
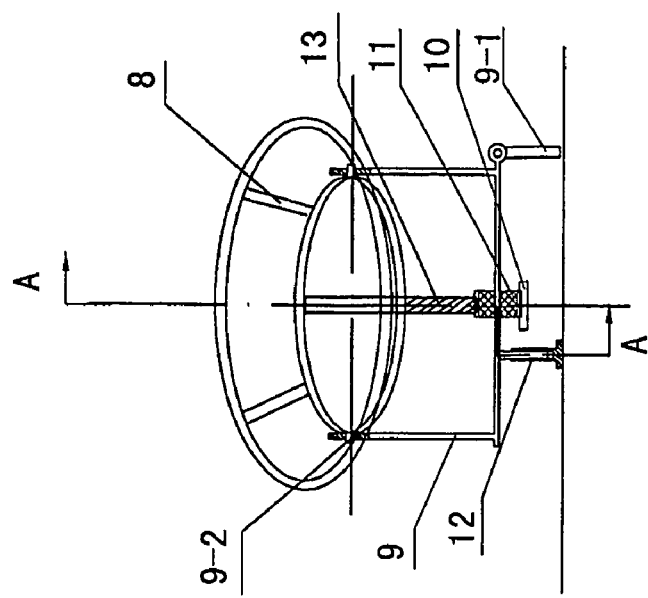
FIG. 3 is a structural schematic view showing a paraboloidal mirror and an implementing mechanical parts.
Figure 4:
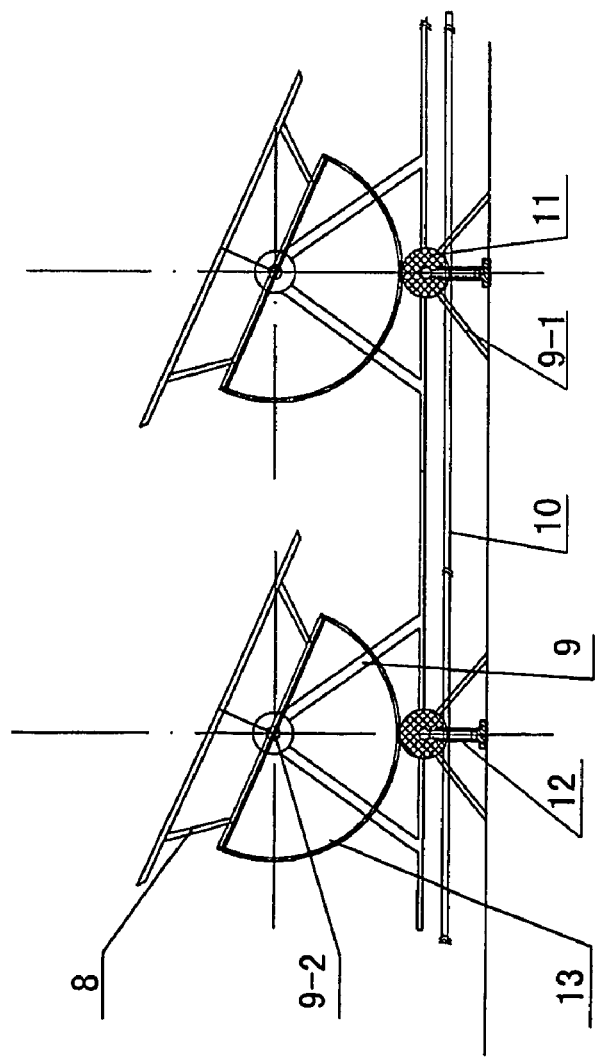
FIG. 4 is a cutaway view along A-A step.

FIGS. 2, 3 and 4 show that light guider 2 of the present embodiment comprises reflection guider mirror 2-1 for focusing light, wherein, the focus of light guider mirror 2-1 superposes the focus of paraboloidal mirror 1 and each said paraboloidal mirror 1 is fixed with a light guiders 2. In the present embodiment, paraboloidal mirror 1 is the curved surface part left by cutting the bow part from the rotation paraboloid reflector with a larger diameter; light guider mirror 2-1 is the bow part or the half curved surface part cut from the rotation paraboloid reflector with a smaller diameter; curved surface condenser mirror 4 is the curved surface part cut from the rotation paraboloid reflector with the largest diameter. The solar shadow areas of light guider 2 and its light guider mirror 2-1 in the present embodiment are 1% and 0.8% of the mirror opening area of paraboloidal mirror 1, respectively.

The light guider 2 of the present invention, with its depression angle being adjustable, is installed on the tip of guider support 5 arranged in the direction of south to north, more specifically, light guider 2 is hinged on guider support 5, and the lower part of said guider support 5 is fixedly or hingedly connected to the mirror basket; said light guilder 2 comprises rotation axis 6 oriented from east to west, mirror bracket 7 hinged on guider support 5 by said rotation axis 6 and the rotation mechanism (not shown in detail); said mirror bracket 7 is structured and sized such that the focus of guider mirror 2-1 superposes the focus of light collecting mirror 1, and the detailed structure is that: mirror bracket 7 is fixed on both ends of the paraboloid light guider mirror 2-1 which is cut into the shape of a bow and forms a "Π" shape. Both arms of said "Π" structure have axle hole (not shown in detail) matching the rotation axis and the central line of said axle hole 6 passes the overlapped focus of the light collecting mirror 1 and the light guider mirror 2-1 so as to keep the focus of the light guider mirror 2-1 superposing the focus of the light collecting mirror 1 whatever the depression/elevation angle of paraboloid light guider mirror 2-1 changes. And in practice, the mirror axis of light guider mirror 2-1 basically points at the mirror opening of one curved surface condenser mirror 4 horizontally, which is under the high precision control of the techniques of the tracking equipment.

Taking the north of the Tropic of Cancer as an example, the elevation angle of south to north of the sun in this region leans yearly to south, the largest focal length of light collecting mirror 1 is designed not to exceed the length from its centre to the outer edge of the half circle gear rim of the tracking equipment (see FIG. 3) when the focal length of light collecting mirror 1 is 0.2-1.5 times of its mirror opening according to the structural analysis on the tracking equipment. In region of a higher latitude, the light reflected by light guider 2 may be shielded by its light collecting mirror 1 when light collecting mirror 1 is used in winter. To resolve the problem, light collecting mirror 1 is designed as a form as shown in FIG. 2, i.e., part area of rotation paraboloidal mirror 1 is removed. The amount of the removed area depends on the focal length, reflection precision of light collecting mirror 1, the location where the light collecting device is fixed and the way of installing the light collecting reflection device.

When designing light guider 2, firstly it needs to consider that the temperature of light guider mirror 2-1 may rise, generally referring to its light receiving area and cooling area. In order to make the system work normally without the installation of a cooling device and the shadow of light guider 2 on light collecting mirror 1 be the least, the basic shape of light guider 2 is determined by cutting the lower part of the rotation paraboloid of light guider 2 off an axial plane, and said plane is formed by the highest point of light collecting mirror 1 and its rotation axis.

In addition, the specific shape of the paraboloid of light guider mirror 2-1 is designed in accordance with the latitude of the region where the system is located and the largest angle of reflection of the light collecting mirror as well, and the farther from the equator, the smaller of the focus-diameter ratio of light guider mirror 2-1.

In practice, the size and the reflection precision of light collecting mirror 1 impact the light convergence strikingly because light collecting mirror 1 reflects the light to form a round focal spot around the focus, i.e., part light has an divergent angle, which makes the light beam transmitted from light guider 2 have a divergent angle. The divergence degree of the light is a critical factor that determines the amount of light beams condensed by a single curved surface condenser mirror 4.

From the calculation, it is known that the higher of the reflection precision of light guider mirror 2-1, the smaller of the divergence degree of the light, and the divergence degree of the light transmitted from some areas of light guider mirror 2-1 is the largest; further, the larger of the opening radius of light guider mirror 2-1, the smaller of the reflection deviation and the larger of the cooling area. But the larger the radius of light guider mirror 2-1, the larger the incident light area of light collecting mirror 1 being shadowed by light guider mirror 2-1; the larger the sectional area of the reflected parallel light beam, the fewer the number of a single group of light collecting mirrors capable of being built up in a same level. An optimization selection may be carried out for a practical configuration according to the above mentioned conditions.

If the parallel precision of the parallel light beam transmitted from light guider mirror 2-1 cannot meet the requirements, an optical lens can be used to compensate the parallel precision: a convex lens ring 2-2 is set between light collecting mirror 1 and guider mirror 2, and a concave lens ring is set between guider mirror 2-1 and curved surface convergence 4, so that the virtual focus of the divergence light is corrected to the area of the focal spot, or turn the divergence light to the light beam to correct the angle of the divergence light with a larger deviation angle, said divergence light is transmitted to the light guider or the curved surface mirror so as to realize the precision compensation. Said method may reduce the focal spot radius to a half of the original.

FIGS. 3 and 4 show that the implementing mechanical parts of the present invention comprise a power supplying device (not shown in detail), rigid straight-bar driver 10, and the south-north elevation angle control mechanism of the mirror opening of each paraboloidal mirror 11, wherein, rigid straight-bar driver 10 couples simultaneously the elevation angle control mechanism 11 of the mirror opening of each paraboloidal mirror arranged in the same array. Said implementing mechanical parts further comprise a hydraulic driver (not shown in detail) and the east-west visual angle control hydraulic pole 12 of the mirror opening of each paraboloidal mirror, wherein, a set of hydraulic driver individually connects to the visual angle control hydraulic pole 12 of the mirror opening of each paraboloidal mirror arranged in the same array. Specifically, light collecting mirror 1 and its basket 8 and the implementing mechanical parts of the tracking equipment are fixed on supporting structure 9 of light collecting mirror 1, half circle gear rim 13 is vertically fixed on two points on the diameter of bracket 8, bracket 8 is hinged on supporting structure 9 through bracket supporting axle 9-2 which is concentric to the axis of half circle gear rim 13; one end of supporting structure 9 of light collecting mirror 1 is hingedly supported on fixed supporting end 9-1, and the other end of supporting structure 9 is supported on hydraulic pole 12. Since a plurality of light collecting mirrors 1 are arranged in a straight line south to north and/or east to west, said tracking equipment is constructed to use straight-bar driver 10, such as a straight rack, to control simultaneously the south-north elevation angle control bevel gear 11 of the mirror openings of each paraboloidal mirror 1 arranged in a same line or a same array. Also, straight-bar driver 10 and elevation angle control mechanism 11 of the mirror opening can be connected by a hydraulic connection device, through which, a set of hydraulic driver individually connects to visual angle control hydraulic pole 12 of the mirror opening of each light collecting mirror 1 arranged in the same array, and simultaneously or individually drives visual angle control hydraulic pole 12 of mirror opening of each light collecting mirror 1 to change the east to west angle of supporting structure 9, i.e., the east to west visual angle of light collecting mirror 1, by adjusting the height of hydraulic pole 12 of the tracking equipment so as to track the changes of the east to west angle of the sun on the very day. For the same reason, straight rack 10 drives bevel gears 11 of multiple light collecting mirrors 1 on the same array to revolve synchronously, and bevel gear 11 drives half circle gear rim 13 to revolve, then half circle gear rim 13 drives light collecting mirror 1 to track the changes of the south to north elevation angle of the sun. These adjustments make sure that the sunlight which is parallel to the principal axis of light collecting mirror 1 irradiates the surface of light collecting mirror 1. Since the device adjusts a plurality of the tracking equipments synchronously, the control system thus can be simplified and the implementing mechanical parts can be decreased but the reliability of the system is greatly enhanced and then the costs of operating and maintaining the system will be lowed reasonably.

The basic operation principle of the solar tracking equipment of the present invention is: using the knowledge of the movement course of the sun together with the computer technology, the adjustment errors caused by temperature or mechanism, etc., can be effectively controlled with the precise feedback using the laser digital monitoring equipment, which keeps the tracking equipment running in high precision and thus meeting the requirements of the system. Although it is already known that the parts processing and the instillation precision relative to the rotation are highly demanded for optical tracking equipment, the requirements for the intensity of the mechanism in the present invention are not strict because the speed of the rotation and the operation of the mechanical parts is slow and the wind receiving area in each light collecting mirror is small. Moreover, some material can be made of aluminum alloy or plastic so as to expense economically, lighten the load and enhance the reliability.

Figure 5:
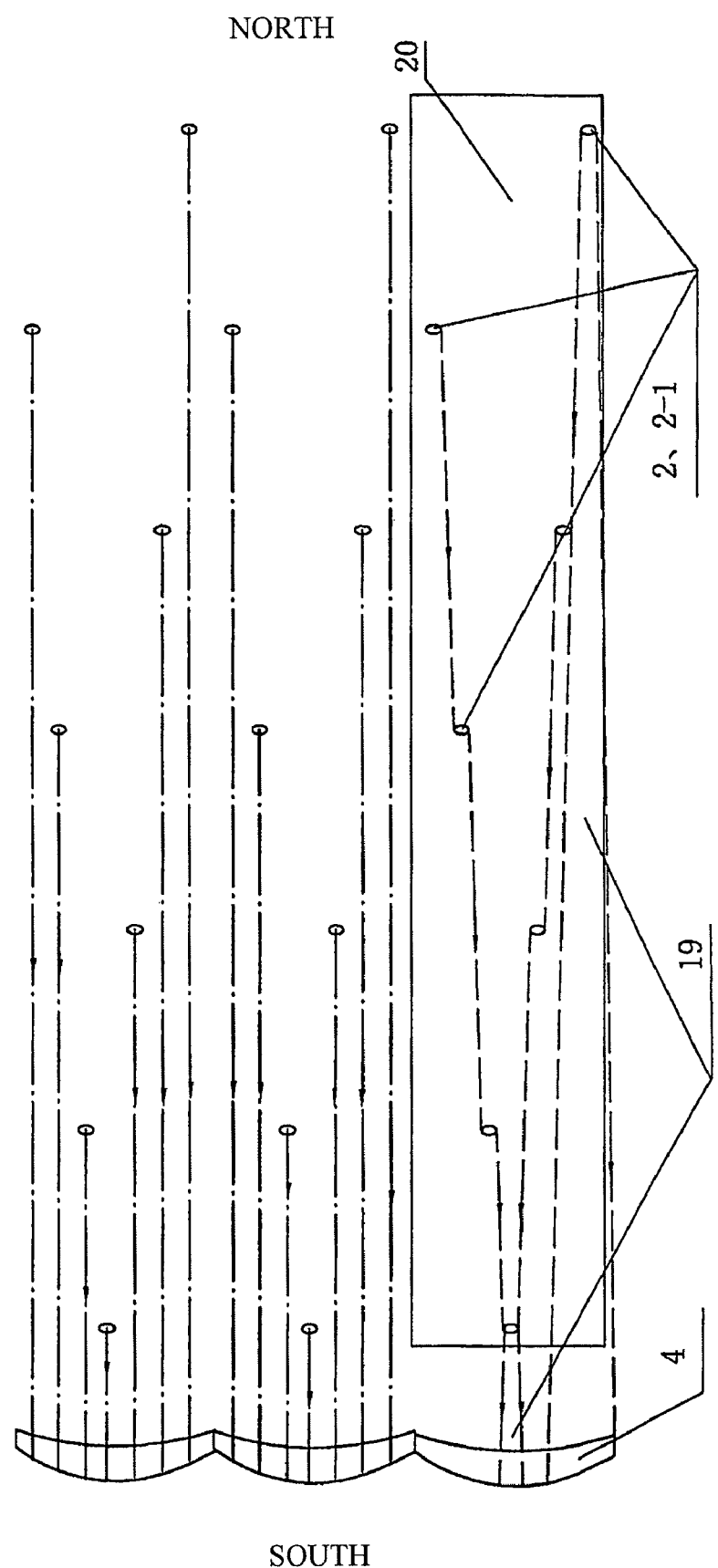
FIG. 5 is a schematic view showing an optical path of the multiple arrays of the light collecting mirrors in an embodiment of the present invention.

FIG. 5 shows a light guider 2 located on each paraboloidal mirror and light guiders 2 on multiple paraboloid mirrors use a common curved surface condenser mirror 4.

Three mirror axes of said curved surface convergence 4 are oriented south to north and arranged closely in arrays in the direction of east to west; the mirror axes of a plurality of light guider mirror 2-1 are also arranged in the direction of sought to north and point horizontally at arrayed curved surface convergence 4. Correspondingly, a plurality of light collecting mirrors 1 (not shown in detail) in arrays are set in same height in the direction of south to north and are arranged linearly in same height in the direction of east to west, and light guider mirrors 2-1 with different distances pointing at same curved surface condenser mirror 4 are arranged in a way of non-interference horizontally.

As shown in FIG. 5, a plurality of paraboloidal mirrors 1 (represented by their own light guider mirrors 2-1) share three curved surface condenser mirrors and send parallel light beams to them respectively, wherein, some light guiders 2 may send parallel light beams to adjacent arrays of curved surface mirrors 4.

Curved surface condenser mirror 4 is set fixedly and each said curved surface condenser mirror 4 is a part of the paraboloid reflector, so that all curved surface condenser mirrors 4 are set without any space and cover the area of the parallel light beam. Frame 20 shows a group of light guider mirrors 2-1 corresponding to one curved surface convergence 4. The light beam reflected from light guider mirror 2-1 is substantially parallel but still has a divergent angle. The above mentioned quasi-parallel light beams 19 converge to a focus after being reflected by curved surface 4, and said focus is set fixedly. A light receiving hole of solar storing and transferring equipment 3 can be further orientated by the position of said focus. The area of said hole will be determined by the reflection precision. Finally, the condensed radiating sunlight with great energy will be preserved into a fixed energy receiving space via said small light receiving hole.

The aim of the device of the present invention is to maximize the amount in unit area of the condensed light beams when the condensed light beams reach curved surface convergence 4. Therefore, light collecting mirror 1 needs to be arranged reasonably. As shown in FIG. 5, light collecting mirror 1 is arranged in the direction of sought to north. Such arrangement makes it possible that a plurality of light collecting mirrors of the same height are arranged in the direction of sought to north, and when quasi-parallel light beams 19 with a certain divergent angle are not shielded, the number of the light collecting mirrors 1 to be arranged is determined by the following factors: first by the latitude of the local, when the factors such as the shape of light collecting mirror 1 are same, the farther from the equator, the fewer light collecting mirror 1 can be installed in the direction of south to north. For the same reason, when the reflection precisions of light collecting mirror 1, light guider mirror 2-1 and curved surface 4 are lower, the number of said mirrors which can be installed is fewer. Further, under the same condition, the yearly operation time is also one of the factors: as the operation time is shorter in winter, the south-north elevation angle needs to be set smaller, then the number of light collecting mirrors 1 to be installed can be greater.

If the reflection precision meets the requirements, light collecting mirrors 1 can also be arranged steppedly at different horizontal heights, i.e., according to the way of arrangement at one level along the longest length of south to north, a repeating arrangement is completed at a higher level. Hence, light collecting mirrors 1 can be arranged in a larger range in the direction of south to north. As a result, the amount of condensed light beams of the objective unit area becomes larger and the thermodynamic system can obtain a larger amount of solar energy, thereby enhancing the volume of a single thermodynamic system. Increasing the volume of a heat utilizing system also means an improvement of the efficiency of utilizing heat, and an enhancement of the efficiency of generating electricity for a unit.

FIGS. 1 and 5 show that solar storing and transferring equipment 3 is a multi-layer structure for preserving heat (not shown in detail), and said structure corresponds to several curved surface condenser mirrors 4 and is provided a light receiving hole (not shown in detail) thereon with a diameter a little larger than that of the focal spot of curved surface condenser mirror 4 for receiving the light condensed by said curved surface condenser mirror 4. A number of curved surface condenser mirrors 4 send highly condensed solar energy to the light receiving hole of solar storing and transferring equipment 3, and the working medium containing air in its deepmost housing receives/stores the solar energy. Each curved surface condenser mirror 4 corresponds to a part of admitted space, and all spaces are connected into a channel for solar utilization. According to the principle of thermology, when the channel area is much larger than the area of the light entrance, the heat exchange of the sunlight in the channel almost equals to the heat exchange of the black body, and then the efficiency of solar utilization will be increased greatly.

When more light collecting mirrors 1 are arranged in a single group, curved surface condenser mirror 4 needs to reflect sunlight of great energy, and the air may not be able to cool the mirrors to a safe working temperature. Therefore, curved surface condenser mirror 4 needs to be provided with a cooling system. However, since curved surface condenser mirrors 4 are arranged in arrays without a space, the process of adding a cooling system will not be complicated.

The entrance of the furnace connects to thermal storage channel 14, and the exit thereof connects to induced draught fan 15. As induced draught fan 15 starts to run, the air moves into the furnace system via thermal storage channel 14, meanwhile, the furnace system is provided with heating surface 16. Thus, the working medium air moves into thermal storage channel 14 and is heated to the desired temperature, and then further moves so as to heating surface 16 to heat the water in furnace tube 17 into saturated steam or supersaturated steam under the desired pressure. The working medium steam in turn drives the matched electricity generation steam turbine set 18. Said furnace can also be configured as a general industrious furnace or a heating furnace.

Evaluation on Heat Utilizing Efficiency of this Solar Furnace System

The energy loss of the solar furnace system includes the following aspects:

The roughly estimated loss of the reflection error caused by the processing precision error of the light collecting mirror is 0.2%.

The roughly estimated loss caused by the reflection ratio of the light collecting mirror is 1%.

The roughly estimated loss of the reflection error caused by the processing precision error of the light guider mirror is 0.2%.

The roughly estimated loss caused by the reflection ratio of the light guider mirror is 1%.

The roughly estimated loss caused by the reflection ratio of the curved surface condenser mirrors is 0.2%.

The loss of the heat dissipation in both the furnace and the thermal storage channel will be less than 0.5%.

When the temperature of the air expelled from the induced draught fan is 40° C. higher than the ambient temperature, the heat loss will be 1%.

The loss of the optical system is: 1−99.8%*99%*99.8%*99%=2.38%.

The thermal efficiency of the solar furnace is: 100−2.38−0.5−1=96.12%.

These calculation results are only a primary estimation, wherein, if all technical parameters are higher than the estimation, the utilization efficiency will be higher than what are listed above, and vice versa. Besides, the expelled air temperature can be designed as a bit higher than the ambient temperature.

Evaluation on the Thermoelectric Power Generation Application and the Economic Cost for the Solar Furnace System Taking a solar furnace with a matched electricity generation steam turbine set of 100 MW as an example:

The desired efficiency of the rated load of an existing electricity generation steam turbine set of 100 MW is higher than 40%, so it can be assumed that the electricity generation efficiency of the set is 40% in view of the furnace loss.

Then the corresponding solar energy collected is 100/40%=250 MW;

When the average amount of the sunlight is 0.8 kw/m²h, the desired light collecting area is 250000/0.8=312400 m².

In order to obtain the maximum light collecting amount per day in the whole year, the set is designed to generate electricity for 24 hours, the load ratio is 100%, and if the time of the radiation is 12 hours, the desired light collecting area is:

$$312400*2=624800\ m^2 \approx 620{,}000\ m^2;$$

If the time of the radiation is 3,000 hours per year, the set runs for 6,000 hours and the average load is 70%, the amount of the electricity generated in one year is:

$$6{,}000*100{,}000*70\% = 420\ \text{million kw·h}.$$

Evaluation on the Investment for the System

Compared with the thermal power generation, the solar electric power generation reduces the civil work in building large-volume units of fuel loading and unloading, transportation, solid fuel pulverization, burning, air preheat, dust catching, ash discharging and pollutant treatment as well as in building the furnace factory, chimney and dock, etc. Compared with the investment in the conventional power station, the investment in other aspects for a solar electric power station will be only ⅓ of the conventional except for the investment in building the field of the optical system of the solar electric power station, i.e., around 1,600 RMB. Calculated from the above item we know 1 kw power generation corresponds to a light collecting mirror of 6 square meters. The following table is an investment estimation for 1 kw in building a solar electric power station. The results are only for your reference, and errors may exist in the calculation.

| Items | Investment estimation (RMB) | Remarks |
|---|---|---|
| Investment in other aspects for building a field except for the optical system | 1600 | About 5000 RMB for a conventional power station |
| Costs for civil work and land tenancy for a optical system | 300 | Based on 50 RMB/m² |
| Investment in tracking equipment | 1500 | 1200 RMB for the mechanical parts |
| Investment in light collecting mirror | 1500 | Estimated according to making a satellite antenna |
| Light guider mirror | 500 | According to the cost for making an optical reflection mirror |
| Horizontal control mechanism | 300 | Independent control, feedback and implementation mechanism |
| Condenser mirror | 100 | Corresponding to 8 light collecting mirrors |
| Thermal storage channel and energy storage media | 200 | |
| Total | 6000 | |

From the above calculations, the investment of building a solar electric power station is higher than a conventional power station. The maintenance cost is mainly affected by each reflection mirror. If the mirrors can be used for 5 years, the year cost for the maintenance will be 420 RMB/kw. Other costs for repair, maintenance and the labour cost will be lower than the conventional power station by 250 RMB/kw and may be roughly estimated as 130 RMB/kw. Based on the above calculation, the system of 1 kw generates electricity as 4200 kw·h. Taking off the consumed electricity by the plant, which is about 2.5% in total, the remaining will be 4100 kw·h. The current electricity fee is 0.35 RMB/kw·h, then the profit is 880 RMB. However, many countries implement preferential policy on tax for the clean energy, therefore, the investment results are hopefully higher than those of a conventional power station, and the environmental effects and the social effects will be much higher.

The invention claimed is:

1. A solar collecting and utilizing device, comprise:
one or more paraboloidal light collecting mirrors, each having a paraboloidal open surface with a focus for collecting/converging the sunlight;
one or more light guiders, each including a light guider mirror, having a focus, for receiving sunlight converged by a corresponding one of said paraboloidal light collecting mirrors and converting it into horizontal and substantially parallel light beams in desired direction;
one or more curved surface condenser mirrors for receiving and converging the horizontal and substantially parallel light beams from said light guider;
a solar storage and conversion device for storing/converting the solar energy converged by said curved surface condenser mirrors; and
a solar tracking equipment for tracking automatically the sunlight so as to keep the opening surface of said paraboloidal light collecting mirrors substantially vertical to the sunlight;
wherein, the focus of said light collecting mirrors superposes the focus of the corresponding light guider mirror; and
wherein said light guider is hinged to the guider support, the lower part of said guider support is fixed to the light collecting mirror or a mirror basket; said light guider comprises a rotation axis in a direction of east to west, a mirror bracket which is hinged to the guider support by said rotation axis, and a rotation mechanism which drives said mirror bracket to rotate about said rotation axis; said mirror bracket is structured and sized, such that the mirror axis of light guider mirror points at the curved surface condenser mirror horizontally and the focus of the light guider mirror always superposes the focus of the corresponding light collecting mirror.

2. The solar collecting and utilizing device of claim 1, wherein, Each paraboloidal light collecting mirror has a corresponding light guider.

3. The solar collecting and utilizing device of claim 1, wherein, a plurality of said light guiders may correspond to only one curved surface condenser mirror.

4. The solar collecting and utilizing device of claim 1, wherein, the solar shadow area of said light guider mirror on said paraboloidal light collecting mirror is 0.1%-1.5% of the area of the opening of said light collecting mirror.

5. The solar collecting and utilizing device of claim 1, wherein, said paraboloidal mirror and/or light guider mirror and/or curved surface condenser mirror are intact paraboloidal rotation type of reflection condenser mirrors or effective light condensing parts thereof, wherein, the ratio of the focal distance of said light collecting mirror to its mirror opening diameter is between 0.55-1.1, and the ratio of the focal distance of said light guider mirror to its mirror opening diameter is between 0.1-0.3.

6. The solar collecting and utilizing device of claim 1, wherein, the one or more curved surface condenser mirrors comprise a plurality of curved surface condenser mirrors defining their respective mirror axes arranged in the direction of south to north and in juxtaposition in the direction of east to west; wherein the one or more light guider mirrors comprise a plurality of light guider mirrors defining their respective mirror axes that are arranged in the direction of south to north and point at arrays of curved surface condenser mirror groups horizontally; a plurality of said light collecting mirrors in arrays are correspondingly arranged in same height in the direction of south to north and arranged linearly in same height in the direction of east to west, and light guider mirrors with different distances pointing at a same curved surface condenser mirror are arranged in a way of non-interference horizontally, or a plurality of light collecting mirrors in arrays are correspondingly arranged linearly in the direction of south to north and arranged linearly in same height in the direction of east to west, and light guider mirrors with different distances pointing at a same curved surface condenser mirror are stepped in a way of non-interference.

7. The solar collecting and utilizing device of claim 1, wherein, the light guider further comprises a convex lens ring provided on the light path between the light collecting mirror and the light guider mirror and/or a concave lens ring provided on the light path between the light guider mirror and the curved surface condenser mirror.

8. The solar collecting and utilizing device of claim 1, wherein, said solar storage and conversion device is a multilayer heat storage structure, said heat storage structure corresponds to a plurality of curved surface condenser mirrors and has a light receiving hole for receiving the condensed light from the curved surface condenser mirrors, and contains a working medium for storing and/or transferring energy therein; said working medium for storing and/or transferring energy is selected from the group of melted salt, water, steam, smelting raw material and photoelectric cell.

9. A system employing the solar collecting and utilizing device of claim 1, said device consists of a paraboloidal mirror, a sunlight collector, a solar storage and conversion device, and a solar tracking equipment, wherein, said sunlight collector comprises a light guider which converts a facula into substantially parallel light beams and reflects them in a desired direction, and a curved surface condenser mirror which receives the substantially parallel light beams reflected from the light guider and converges them into the solar storage and conversion device, characterized in that: said solar storage and conversion device is configured as a multi-layer heat storage structure and said heat storage structure corresponds to a plurality of curved surface mirrors and has a light receiving hole for receiving the condensed light from the curved surface mirror; said heat storage structure contains a working medium for storing and/or transferring energy in its deepmost housing; said working medium for storing and/or transferring energy is selected from the groups of melted salt, water steam, smelting raw material and photoelectric cell.

* * * * *